United States Patent

[11] 3,552,289

[72] Inventor Sakae Fujimoto
 Tokyo, Japan
[21] Appl. No. 671,714
[22] Filed Sept. 29, 1967
[45] Patented Jan. 5, 1971
[73] Assignee Kabushiki Kaisha Ricoh
 Tokyo, Japan
 a corporation of Japan
[32] Priority Oct. 7, 1966
[33] Japan
[31] No. 41/66103

[54] IRIS MECHANISM IN BODY OF INTERCHANGEABLE-LENS CAMERA
 1 Claim, 2 Drawing Figs.
[52] U.S. Cl. ............................................. 95/64,
 95/10, 95/42
[51] Int. Cl. ...................................... G03b 7/12,
 G03b 19/12

[50] Field of Search............................................ 95/106, 42,
 44, 64, 64A, 64B

[56] References Cited
UNITED STATES PATENTS
| 3,326,107 | 6/1967 | Rentschler | 95/64 |
| 3,394,644 | 7/1968 | Ettischer | 95/64 |
| 3,080,803 | 3/1963 | Uno | 95/42X |
| 3,446,126 | 5/1969 | Leitz et al. | 95/10(C) |

Primary Examiner—John M. Horan
Assistant Examiner—Joseph F. Peters, Jr.
Attorney—Burgess, Ryan & Hicks ABSTRACT: A camera body adapted to receive various interchangeable lenses of the same f-number is equipped with an iris (which may be coupled to an exposure meter) in its body behind the position occupied by the lens so that a single iris may be employed with all lenses.

PATENTED JAN 5 1971    3,552,289

Sakae Fujimoto

IRIS MECHANISM IN BODY OF INTERCHANGEABLE-LENS CAMERA

The object of this invention is to provide a camera body adapted to receive a plurality of interchangeable lenses, said camera body having an iris cooperating with an exposure meter.

The camera to which above invention can be applied is not limited to a single reflex type camera, however this invention will be most effective when it is applied to a single reflex camera of so called full-opened iris T.T.L.S. lens interchangeable type in which the correct photographic exposure is set according to the light quantity passing through the photographic lens in the full-opened condition.

Figure 1:
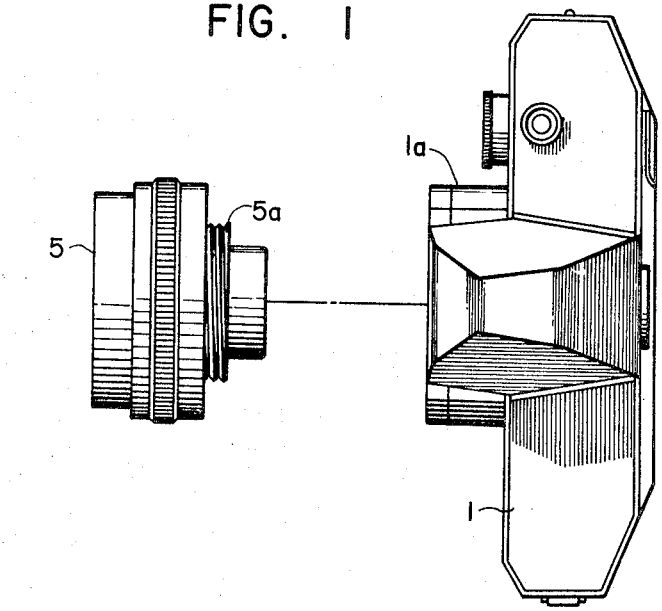
FIG. 1 is a plan view illustrating an example where this invention is applied to a single lens reflex camera, and a photographic lens is shown apart from the camera body.
Figure 2:
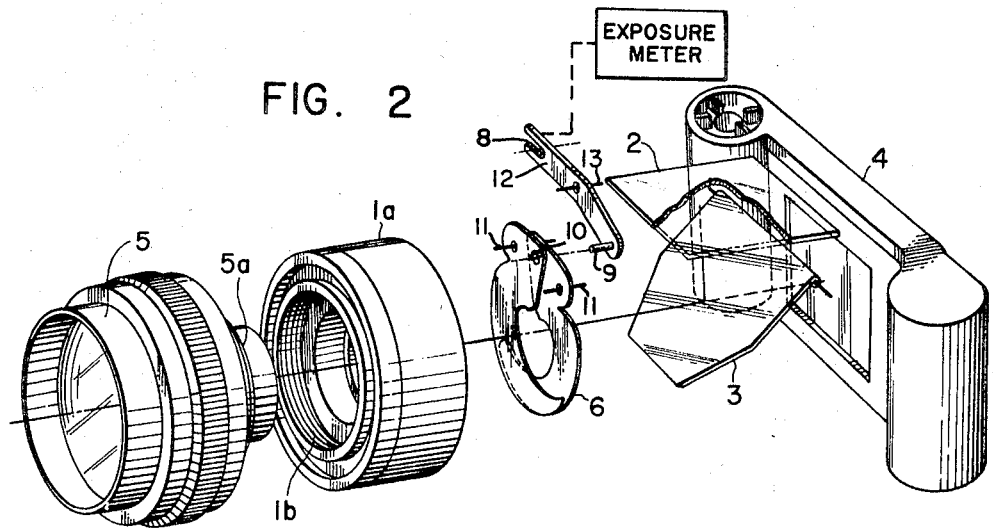
FIG. 2 is a partially assembled oblique projection drawing of main parts shown in FIG. 1, where only the front projecting cylinder portion for mounting interchangeable lenses, a focusing plate, and a movable reflecting mirror are shown.

The single reflex camera shown in the drawings as an embodiment of this invention has in its body 1 a focusing plate 2 and a movable reflecting mirror 3 and is so designed that a film cartridge 4 such as, for example, that known by the trademark "Kodapack," can be loaded. A projecting cylinder portion 1a is provided at the front of said body for mounting selectively the interchangeable photographic lens 5 by screw or bayonet and the like.

In the example illustrated in the drawing, the male screw 5a at the rear portion of the lens retainer for the photographic lens 5 is so designed as to screw in the female screw provided at the front inside of said projecting cylinder portion 1a, a shutter (not shown in the drawing) and movable iris plates 6 being provided at the rear of said photographic lenses inside of said projecting cylinder portion 1a.

Each movable iris plate 6 is pivoted about a fixed pin 11, and each is provided with a hole 10. A pivoted bar 12 is mounted for rotation about a fixed pin 13 which passes through hole 7. A pin 9 at one end of bar 12 passes through the aligned holes 10 in the iris plates. At the opposite end of bar 12 a slot 8 is formed to receive a pin (not shown) which is vertically movable by a photoelectric exposure meter mechanism (indicated diagrammatically). Such movement results in vertical motion of pin 9 and consequently swings the crescent-shaped iris plates on their fixed pins 11, increasing or decreasing the iris opening defined between them.

No special exposure meter structure is shown, as such structures are well known. A suitable trapped-needle mechanism is shown, for in FIG. 11 of U.S. Pat. No. 3,326,107 to Rentschler, in which a rotatable diaphragm control ring 24 is analogous (except for its placement within the lens barrel) to pivoted bar 12, slot 24a of the Rentschler device corresponding to slot 8 of the device disclosed herein. While the photocell in the Rentschler photoelectric exposure meter receives light from the scene directly, a similar cell in the camera described herein receives light which has passed through the lens. Structures which accomplish this are well-known; in the embodiment shown the photocell "looks" at the image on focusing plate.

Although the shutter in this case is a behind the lens shutter, the shutter may be a focal plane shutter. The camera shown in the drawing is so designed that a suitable iris opening and exposure time may be set manually following the indication of the exposure meter which is built in the camera for measuring the quantity of the light which passes through the photographic lens when the iris is full-opened, or the preset position of the iris ring may be controlled by the said exposure meter, or the exposure time may be automatically set by the said exposure meter.

As is well-known, the iris opening and exposure time are variables which have a definite relationship for each value of exposure. In the embodiment discussed below it is assumed that the exposure time of the shutter is preset.

Thus the residual variable for a desired exposure is only the iris opening.

As the said iris plates 6 are provided on the camera body side and operate in the same manner with all the interchangeable lenses and the exposure meter measures the light at full-opened iris condition, all interchangeable lenses which are selectively mounted to the camera of this example must be so designed as to have the same diameter ratio i.e. $f$ value, though the focal length of respective lens may be different.

If a behind the lens shutter is used, the shutter must be, of course, fully open while the behind the lens exposure meter is measuring the scene brightness.

In a single reflex camera as described above, the construction of the interchangeable lens retainer itself becomes very simple as the iris plate is provided at the camera body side, and when the mechanism of said iris plate is connected to the exposure meter built in at the camera body side, the mechanical design of the connecting mechanism becomes very simple compared with the case where the iris plate is provided on the photographic lens side.

I claim:

1. In a camera having a camera body, a film holder in said body adapted to hold film in a desired position during exposure, lens-receiving means in the camera body adapted to hold any one of a plurality of lenses in spaced relation to the film holder, a shutter adapted to move between a closed position in which said shutter protects film in the film holder from light passing through a lens in the lens-receiving means and an open position in which the shutter permits the passage such light, and shutter control means for moving the shutter from the closed to the open position when said shutter control means is activated, the improvement comprising a plurality of interchangeable lenses of the type that has no adjustable iris and is therefore of a fixed $f$-value, said lenses having different focal lengths but the same $f$-value and said lenses being adapted to be held by the lens-receiving means; an iris located within the camera body in the light path between the position occupied by the rear element of a lens in the lens-receiving means and the film holder, said iris being movable between a wide-open position and any one of a plurality of partially shut positions, said iris when in a partially shut position partially occluding the light path between the lens and the film holder, through-the-lens exposure meter means for measuring scene brightness by measuring the intensity of light which has passed through a lens held in the lens receiving means and through the iris, and control means linking the exposure meter means to the iris for moving the iris from the wide-open position to a desired partially shut position selected in accordance with the intensity of light measured by the exposure meter, said movement occurring immediately before the activation of the shutter control means.